US012682369B2

(12) United States Patent
Kim

(10) Patent No.: US 12,682,369 B2
(45) Date of Patent: Jul. 14, 2026

(54) SYSTEM AND METHOD FOR TRADING PRIVACY INFORMATION

(71) Applicant: MDPERT Co., Ltd., Seoul (KR)

(72) Inventor: Kyoung Hoon Kim, Seoul (KR)

(73) Assignees: MDPERT Co., Ltd., Seoul (KR); Kyoung Hoon Kim, Seoul (KR)

( * ) Notice: Subject to any disclaimer, the term of this patent is extended or adjusted under 35 U.S.C. 154(b) by 99 days.

(21) Appl. No.: 18/111,909

(22) Filed: Feb. 21, 2023

(65) Prior Publication Data

US 2023/0316314 A1     Oct. 5, 2023

(30) Foreign Application Priority Data

Mar. 30, 2022     (KR) ........................ 10-2022-0039319

(51) Int. Cl.
*G06Q 30/0201*          (2023.01)
*G06Q 30/0208*          (2023.01)
(52) U.S. Cl.
CPC ..... *G06Q 30/0206* (2013.01); *G06Q 30/0208* (2013.01)
(58) Field of Classification Search
CPC ............ G06F 21/6254; G06Q 30/0206; G06Q 30/0208
See application file for complete search history.

(56) References Cited

U.S. PATENT DOCUMENTS 8,271,315 B2 *  9/2012  Kagiwada .............. G06Q 30/02
                                                   705/7.29
8,577,933 B2 * 11/2013  Evenhaim .......... G06F 21/6254
                                                   707/693
(Continued)

FOREIGN PATENT DOCUMENTS

CN        106230851 B  * 12/2019 ......... H04L 63/0428
JP        2002056111 A  * 2/2002 ............. G06Q 30/02
(Continued)

OTHER PUBLICATIONS

Trevor Clohessy, "Blockchain and Distributed Ledger Technology Use cases", published by Springer in 2020 (Year: 2020).*
(Continued)

*Primary Examiner* — Omar Zeroual
(74) *Attorney, Agent, or Firm* — Revolution IP, PLLC

(57)          ABSTRACT

A system for trading privacy information includes a privacy information collection unit that receives and collects the privacy information of the information provider from the information provider terminal; a purchase information collection unit that receives and collects a pre-set reward information; a list generation unit that generates a purchase information list by listing reward information determined according to the content of promotion information and the scope of privacy information for each information purchaser by using the collected promotion information and reward information; a scope setting unit that sets the scope of providing the information purchaser and privacy information selected by the information provider through the purchase information list provided to the information provider terminal; and a reward amount calculation unit that calculates the reward amount paid from the related information purchaser to the information provider.

2 Claims, 4 Drawing Sheets

(56)                References Cited

U.S. PATENT DOCUMENTS

| | | | | |
|---|---|---|---|---|
| 9,853,959 | B1 * | 12/2017 | Kapczynski | H04L 63/08 |
| 10,460,126 | B2 * | 10/2019 | Pead | G06Q 30/0201 |
| 10,755,281 | B1 * | 8/2020 | Yip | G06Q 20/4016 |
| 10,776,802 | B1 * | 9/2020 | Sterling | G06Q 30/0222 |
| 10,796,260 | B2 * | 10/2020 | Brannon | G06F 21/577 |
| 10,798,131 | B2 * | 10/2020 | Finkelstein | H04L 63/0428 |
| 10,832,299 | B1 * | 11/2020 | Clauss | G06F 21/6209 |
| 10,984,132 | B2 * | 4/2021 | Barday | G06F 21/6245 |
| 11,151,607 | B2 * | 10/2021 | Ericson | G06Q 20/0658 |
| 11,356,430 | B1 * | 6/2022 | Kapczynski | H04L 63/08 |
| 11,423,433 | B2 * | 8/2022 | Hayasaka | G06Q 30/0236 |
| 11,520,922 | B2 * | 12/2022 | Marlin | H04L 63/1408 |
| 11,727,140 | B2 * | 8/2023 | Cropp | G06F 16/248 |
| | | | | 726/30 |
| 12,061,722 | B1 * | 8/2024 | Pena | H04L 9/50 |
| 2001/0037294 | A1 * | 11/2001 | Freishtat | G06Q 40/00 |
| | | | | 709/201 |
| 2002/0019817 | A1 * | 2/2002 | Matsui | G06F 21/10 |
| 2002/0055884 | A1 * | 5/2002 | Tokuma | G06Q 30/0633 |
| | | | | 705/26.43 |
| 2002/0103806 | A1 * | 8/2002 | Yamanoue | G06F 16/9535 |
| 2003/0120590 | A1 * | 6/2003 | Ieshima | G06Q 20/24 |
| | | | | 705/38 |
| 2003/0154171 | A1 * | 8/2003 | Karp | G06Q 30/02 |
| | | | | 705/78 |
| 2008/0221964 | A1 * | 9/2008 | Berkovitz | G06Q 30/02 |
| | | | | 705/80 |
| 2009/0240626 | A1 * | 9/2009 | Hasson | G06Q 20/3227 |
| | | | | 705/17 |
| 2010/0185546 | A1 * | 7/2010 | Pollard | G06Q 30/02 |
| | | | | 705/26.1 |
| 2012/0304273 | A1 * | 11/2012 | Bailey | G06Q 20/3829 |
| | | | | 726/9 |
| 2013/0211876 | A1 * | 8/2013 | Perler | G06F 21/31 |
| | | | | 726/28 |
| 2014/0040134 | A1 * | 2/2014 | Ciurea | G06Q 20/383 |
| | | | | 705/44 |
| 2014/0278991 | A1 * | 9/2014 | Sandoval | G06Q 30/0257 |
| | | | | 705/14.55 |
| 2015/0142686 | A1 * | 5/2015 | Baldwin | G06Q 50/265 |
| | | | | 705/325 |
| 2016/0253521 | A1 * | 9/2016 | Esmailzadeh | G06F 21/602 |
| | | | | 726/4 |
| 2017/0083931 | A1 * | 3/2017 | Allinson | G06Q 30/0224 |
| 2017/0286892 | A1 * | 10/2017 | Studnicka | G06Q 20/3224 |
| 2018/0181996 | A1 * | 6/2018 | Matthews | G06Q 30/0269 |
| 2018/0262514 | A1 * | 9/2018 | Hall | H04L 63/105 |
| 2019/0012249 | A1 * | 1/2019 | Mercuri | G06Q 20/308 |
| 2019/0019208 | A1 * | 1/2019 | Postrel | G06Q 30/0214 |
| 2019/0188411 | A1 * | 6/2019 | Kroutik | H04L 9/3297 |
| 2020/0058023 | A1 * | 2/2020 | Travizano | H04L 9/3239 |
| 2020/0357024 | A1 * | 11/2020 | Blaikie, III | G06Q 30/0255 |
| 2021/0182915 | A1 * | 6/2021 | Blaikie, III | G06Q 30/0276 |
| 2021/0192075 | A1 * | 6/2021 | Sweeney | G06F 21/6245 |
| 2021/0241372 | A1 * | 8/2021 | Chen | G06F 16/2379 |
| 2021/0342894 | A1 * | 11/2021 | Pestana | G06Q 30/0277 |
| 2021/0390190 | A1 * | 12/2021 | Walker | G06Q 30/0236 |
| 2024/0261692 | A1 * | 8/2024 | Sliwka | H04L 9/3213 |

FOREIGN PATENT DOCUMENTS

| | | | | | |
|---|---|---|---|---|---|
| JP | 2002329058 | A | * | 11/2002 | G06F 16/9535 |
| JP | 6816905 | B1 | * | 1/2021 | G16Y 20/40 |
| JP | 2021117986 | A | * | 8/2021 | G16Y 40/20 |
| KR | 10-2002-0081563 | A | | 10/2002 | |
| KR | 10-2014-0096226 | A | | 8/2014 | |
| KR | 20150090568 | A | * | 8/2015 | G06F 21/6254 |
| WO | WO-2015105403 | A1 | * | 7/2015 | G06Q 20/123 |
| WO | WO-2015115746 | A1 | * | 8/2015 | G06Q 30/06 |
| WO | WO-2020183726 | A1 | * | 9/2020 | G06F 21/6254 |
| WO | WO-2021149804 | A1 | * | 7/2021 | G16Y 40/30 |

OTHER PUBLICATIONS

Priyanka Sharma, "Blockchain Technology as an Approach for data marketplace", published by ICBCT in 2019 (Year: 2019).*

* cited by examiner

[FIG. 1]
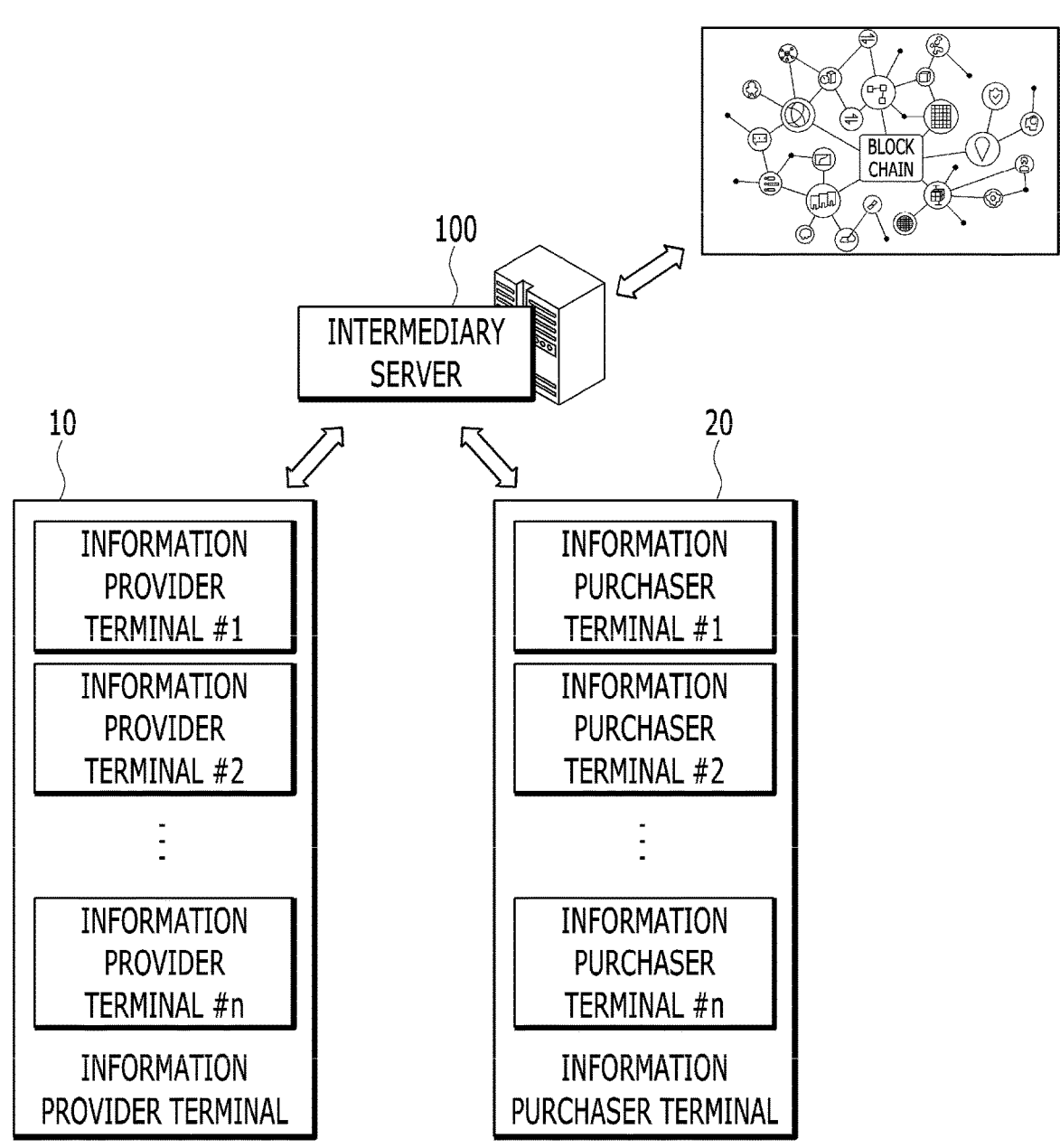

[FIG. 2]
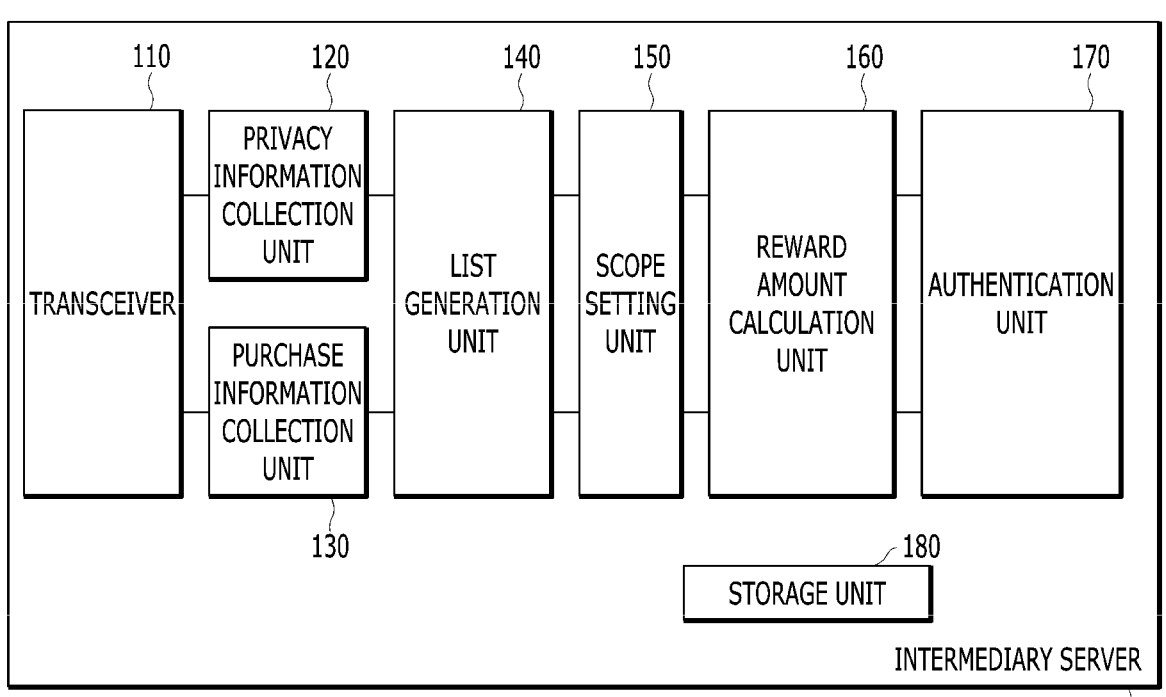

[FIG. 3]

| INFORMATION PURCHASER #1 | PRIVACY INFORMATION #1: REWARD AMOUNT **** WON ▫<br>PRIVACY INFORMATION #2: REWARD AMOUNT **** WON ▫<br>PRIVACY INFORMATION #3: REWARD AMOUNT **** WON ▫<br>PRIVACY INFORMATION #4: REWARD AMOUNT **** WON ▫<br>PRIVACY INFORMATION #5: REWARD AMOUNT **** WON ▫ |
|---|---|
| INFORMATION PURCHASER #2 | PRIVACY INFORMATION #1: REWARD AMOUNT **** WON ▫<br>PRIVACY INFORMATION #2: REWARD AMOUNT **** WON ▫<br>PRIVACY INFORMATION #3: REWARD AMOUNT **** WON ▫<br>PRIVACY INFORMATION #4: REWARD AMOUNT **** WON ▫ |
| INFORMATION PURCHASER #3 | PRIVACY INFORMATION #1: REWARD AMOUNT **** WON ▫<br>PRIVACY INFORMATION #2: REWARD AMOUNT **** WON ▫<br>PRIVACY INFORMATION #3: REWARD AMOUNT **** WON ▫ |
| ⋮ | ⋮ |
| INFORMATION PURCHASER #N | PRIVACY INFORMATION #1: REWARD AMOUNT **** WON ▫<br>PRIVACY INFORMATION #2: REWARD AMOUNT **** WON ▫<br>PRIVACY INFORMATION #3: REWARD AMOUNT **** WON ▫<br>PRIVACY INFORMATION #4: REWARD AMOUNT **** WON ▫<br>PRIVACY INFORMATION #5: REWARD AMOUNT **** WON ▫<br>PRIVACY INFORMATION #6: REWARD AMOUNT **** WON ▫ |

[FIG. 4]

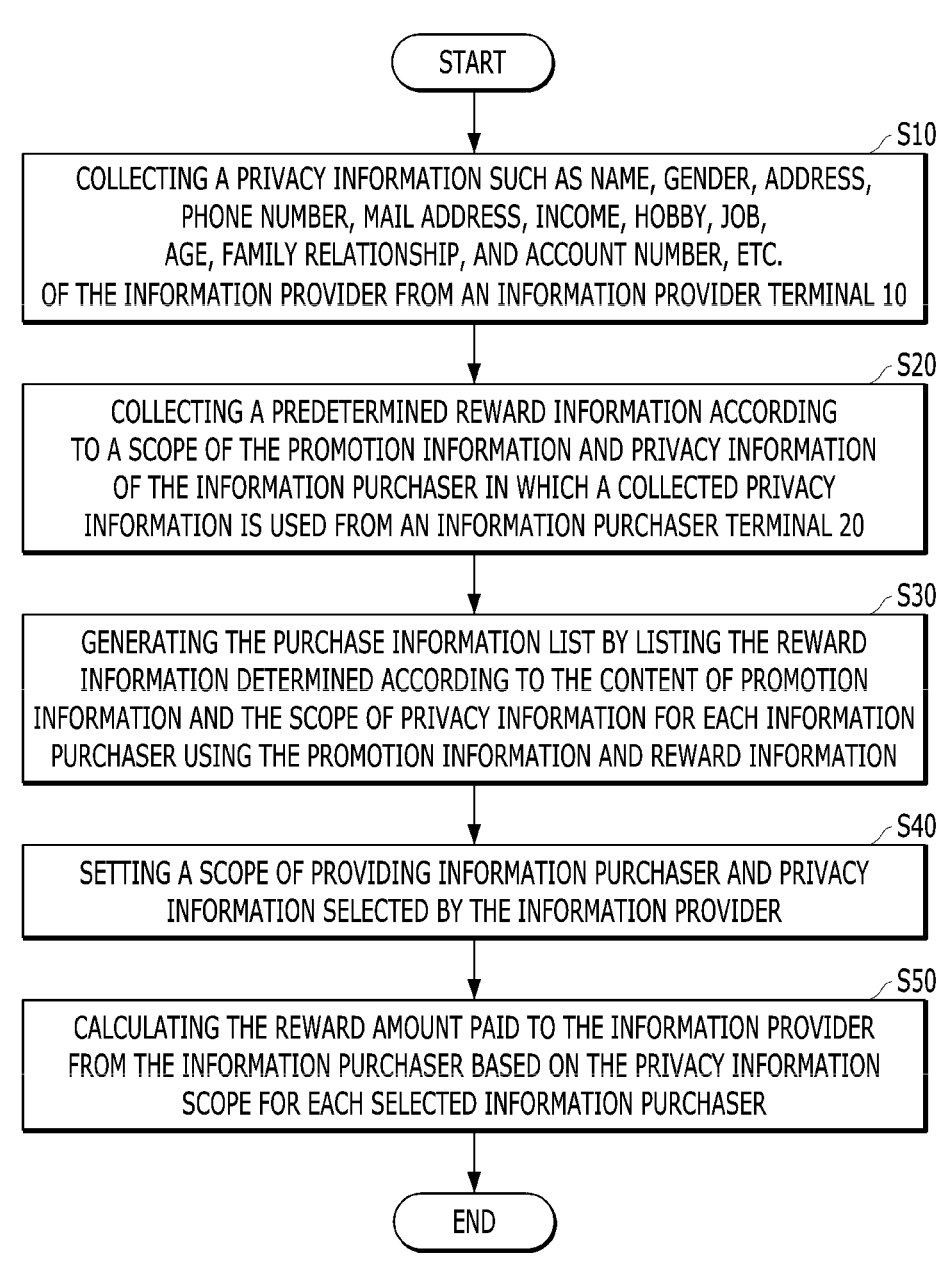

START

S10

COLLECTING A PRIVACY INFORMATION SUCH AS NAME, GENDER, ADDRESS, PHONE NUMBER, MAIL ADDRESS, INCOME, HOBBY, JOB, AGE, FAMILY RELATIONSHIP, AND ACCOUNT NUMBER, ETC. OF THE INFORMATION PROVIDER FROM AN INFORMATION PROVIDER TERMINAL 10

S20

COLLECTING A PREDETERMINED REWARD INFORMATION ACCORDING TO A SCOPE OF THE PROMOTION INFORMATION AND PRIVACY INFORMATION OF THE INFORMATION PURCHASER IN WHICH A COLLECTED PRIVACY INFORMATION IS USED FROM AN INFORMATION PURCHASER TERMINAL 20

S30

GENERATING THE PURCHASE INFORMATION LIST BY LISTING THE REWARD INFORMATION DETERMINED ACCORDING TO THE CONTENT OF PROMOTION INFORMATION AND THE SCOPE OF PRIVACY INFORMATION FOR EACH INFORMATION PURCHASER USING THE PROMOTION INFORMATION AND REWARD INFORMATION

S40

SETTING A SCOPE OF PROVIDING INFORMATION PURCHASER AND PRIVACY INFORMATION SELECTED BY THE INFORMATION PROVIDER

S50

CALCULATING THE REWARD AMOUNT PAID TO THE INFORMATION PROVIDER FROM THE INFORMATION PURCHASER BASED ON THE PRIVACY INFORMATION SCOPE FOR EACH SELECTED INFORMATION PURCHASER

END

SYSTEM AND METHOD FOR TRADING PRIVACY INFORMATION

TECHNICAL FIELD

The present disclosure relates to a system and method for trading privacy information, and more particularly, to a system and method for trading the privacy information that can allow an information provider selling the privacy information to select an information purchaser who wants to purchase the privacy information and can limit the scope of privacy information sold.

DESCRIPTION OF THE RELATED ART

The privacy information is unknowingly leaked or misused, and various advertisements, events, loans, and commodity advertisements are often received through phone calls, e-mails, etc. from individuals or companies that they do not know at all. As a result, an individual privacy is greatly violated, which becomes a serious social problem. A user feels very unpleasant and embarrassing when the information is unknowingly used or illegally provided to others, and in some cases, the user feels a sense of crisis due to leakage of the privacy information.

Meanwhile, in fields such as marketing and market research, since it is possible to reduce the market targeting and marketing costs by using such privacy information, transactions are being secretly made to get the privacy information.

Like this, the existence of a demand for the privacy information in the market means that the privacy information is valuable, and that the privacy information can be traded. However, when the privacy information is secretly used without any costs and infringes on an individual's privacy, this may adversely affect all of the individual, businesses and sellers who need such information.

Individuals who want to actively sell the privacy information also feel a sense of crisis with considerable rejection if they are identified by selling the privacy information, or even if they cannot identify individuals, if access to individuals through advertisements, phone calls, or e-mails is made indiscriminately.

Like this, although conventional technology supports legal transactions between individuals and purchasers who want the privacy information to actively provide information, an information provider agrees to receive certain coupons or points, etc. through a brokerage agency and provide their privacy information to random purchasers. In other words, the information provider cannot fully and actively provide the privacy information to the information purchaser, but they are in the form of delegating the privacy information to the brokerage agency.

Therefore, the information provider has agreed to provide the privacy information through the brokerage agency, but there is a problem in that the information provider does not know what scope of privacy information is provided to which information purchaser. This has a problem in that there is no way to check whether one's privacy information is used by a legal information purchaser within the scope of one's consent the information purchaser, and the scope of privacy information, etc., or whether one's privacy information is obtained and used indiscriminately by an illegal information purchaser.

Also, since it is difficult for an information purchaser to check whether the information provider is the legal information purchaser from the standpoint of advertising using the privacy information legally obtained through an intermediary, not only can it negatively affect the image of the information purchaser advertisers, but the probability of receiving and clicking online advertisements is greatly reduced, and in particular, the advertising effect is greatly reduced because it is not differentiated by the characteristics of information providers. Meanwhile, even if differentiated advertisements are provided to each information provider, since advertisements are also provided regardless of the will of information providers who encounter the advertisement, there has been a problem of deriving negative reactions from the information providers.

RELATED ART DOCUMENT

Patent Document

Patent Document 1 Korean Public Laid-Open Publication No. 10-2014-0096226 (Publication Date: Aug. 5, 2014)
Patent Document 2 Korean Public Laid-Open Publication No. 10-2002-0081563 (Publication Date: Oct. 28, 2002)

CONTENTS OF THE INVENTION

Summary

The present disclosure is configured to solve the above-described problems, and the present disclosure is to provide a system and method for trading privacy information that can allow an information provider selling the privacy information to select an information purchaser who wants to the purchase privacy information and can limit the scope of privacy information sold.

The present disclosure is to provide a system and method for trading privacy information in which the information provider who wants to sell the privacy information to the information purchaser who wants to purchase another person's privacy information using the Internet can sell the privacy information by the own judgment and decision.

The present disclosure is to provide a system and method for trading privacy information that can allow the information purchaser to sell at different amounts depending on the scope of privacy information they want to sell.

The present disclosure is to provide a system and method for trading privacy information to use the privacy information in the related intermediary server by distributing and storing the privacy information in a block using a blockchain when the privacy information used in an intermediary server is input from an information provider terminal.

The present disclosures are not limited to the above-mentioned purposes, and other purposes and advantages of the present disclosure that are not mentioned may be understood by the following explanation, and will be more clearly understood by exemplary embodiments of the present disclosure. Also, it will be easily seen that the objectives and advantages of the present disclosure may be realized by means indicated in the claims of a patent application and combinations thereof.

Technical Solution

A system and method for trading privacy information according to the present disclosure to achieve the above-described purposes may include a privacy information collection unit that receives and collects the privacy information of the information provider from the information provider terminal; a purchase information collection unit that receives and collects a pre-set reward information according to the scope of promotion information and privacy information of an information purchaser using the privacy information from the information provider terminal; a list generation unit that generates a purchase information list by listing reward information determined according to the content of promotion information and the scope of privacy information for each information purchaser by using the collected promotion information and reward information; a scope setting unit that sets the scope of providing the information purchaser and privacy information selected by the information provider through the purchase information list provided to the information provider terminal; and a reward amount calculation unit that calculates the reward amount paid from the related information purchaser to the information provider based on the privacy information scope of each information purchaser and information purchaser selected in the scope setting unit.

The purchase information list may display the reward information determined separately according to the scope of use of privacy information set by the information purchaser, and may configure a selection window so that at least one of the displayed reward information can be selected by the information provider.

A method for trading privacy information according to the present disclosure to achieve the above purposes may include (A) receiving and collecting the privacy information of the information provider from the information provider terminal using the privacy information collection unit; (B) receiving and collecting a pre-set reward information according to the scope of the promotion information and privacy information of the information purchaser, which uses the collected privacy information from the information purchaser terminal using the purchase information collection unit; (C) generating the purchase information list by listing the reward information determined according to the contents of the promotion information and the scope of privacy information for each information purchaser by using the collected promotion information and reward information by using the list generation unit; (D) setting the scope of providing the information purchaser and privacy information selected by the information provider, through the purchase information list provided to the information provider terminal by using the scope setting unit; and (E) calculating the reward amount paid from the related information purchaser to the information provider based on the scope of privacy information by the selected information purchaser and information purchaser by using the reward amount calculation unit.

Effects of the Invention

As described above, a system and method for trading privacy information according to the present disclosure has the effects as follows.

First, since the information provider who sells the privacy information can select the information purchaser who want to purchase the privacy information, and limit the scope of privacy information they sell, and the information provider may make the privacy information available only to legitimate the purchaser of the information selected within the scope of the consent (the information purchaser, and the privacy information, etc.), and further may identify this. This can prevent the illegal information purchaser or the legal information purchaser from obtaining their privacy information and indiscriminately using the information.

Second, since the information provider who wants to sell the privacy information to the information purchaser who wants to purchase another person's privacy information by using the Internet can sell the privacy information by the own judgement and decision, the information provider has the effect of fully and actively selling the privacy information to information purchasers. In particular, the information provider can expand the privacy information sold within the scope of households family, which has an advantageous effect for marketing.

Third, it is possible to receive an appropriate amount of reward for the privacy information sold from the information purchaser by setting a different amount according to the scope of privacy information that the information purchaser wants to sell.

Fourth, when an advertisement is performed using the privacy information legally obtained through the brokerage agency, etc., it becomes easy to check whether it is a legitimate information purchaser, which can have a positive effect on the image of the information purchaser advertiser, as well as greatly increasing the reception and click provability on online advertisements. In particular, since differentiated promotion may be performed according to the characteristics of the information provider, there is an effect of increasing the promotional effect.

Fifth, in the case of promotional content provided to each information provider, as the information provider can provide differentiated advertisements with the promotion information of the information purchaser selected, the information providers having the promotion information can derive positive responses from the information providers because advertisements are provided according to their will.

Sixth, it does not store any information about the privacy information of the information provider in the intermediary server, but distributes it in the block of the blockchain, and thus, there is an effect of safely storing the user's privacy information and preventing inconvenience in using the service.

In addition to the above-described effects, the detailed effects of the present disclosure will be described together with the detailed description for implementing the present disclosure.

BRIEF EXPLANATION OF THE DRAWING

FIG. 1 is a diagram illustrating the constitution of a system for trading privacy information according to an exemplary embodiment of the present disclosure.

FIG. 2 is a block diagram specifically illustrating the constitution of the intermediary server in FIG. 1.

FIG. 3 is an exemplary embodiment illustrating the constitution of a purchase information list generated by the list generation unit illustrated in FIG. 2.

FIG. 4 is a flowchart for explaining a system for trading privacy information according to the exemplary embodiment of the present disclosure.

DETAILED DESCRIPTION

Other purposes, characteristics, and advantages of the present disclosure may be understood more readily by reference to the detailed description of exemplary embodiments and the accompanying drawings.

The terminology used herein is defined in consideration of the function of corresponding components used in the present disclosure and may be varied according to users, operator's intention, or practices. In addition, an arbitrary defined terminology may be used in a specific case and will be described in detail in a corresponding description paragraph. Therefore, the terminology used herein is for the purpose of describing particular exemplary embodiments only and is not intended to be limiting of the invention.

Throughout the specification, if a part "includes" a component, this means that other components may be further included without excluding the other components unless otherwise opposed. Also, terms such as "unit" and "module", etc., which are described in the specification, means a unit that processing at least one function or operation, and this can be realized by a hardware or a software, or by a combination of the hardware and software.

A preferred exemplary embodiment of a system and method for trading privacy information according to the present disclosure is described below with reference to the accompanying drawings. However, the present disclosure may be embodied in many different forms, and should not be constructed as being limited to the exemplary embodiments set forth herein. Rather, these exemplary embodiments are provided so that the disclosure will be through and computer and will fully convey the concept of the invention to those skilled in the art. Therefore, the exemplary embodiments described in the specification and the constitution shown in the drawings are only the most desirable exemplary embodiments of the invention and do not represent all of the technical ideas of the invention, and thus, it should be understood that at the time of the present application, there may be various equivalents and modified examples that may replace them.

Hereinafter, it should be understood that if one component is described as "connected", "combined", or "contacted" to another component, the components may be directly connected or contacted to each other, but different components may be connected", "combined", or "contacted" through another component.

FIG. 1 is a diagram illustrating the constitution of a system for trading privacy information according to an exemplary embodiment of the present disclosure.

As illustrated in FIG. 1, a system for trading privacy information of the present disclosure may include an information provider terminal 10, an information purchaser terminal 20, and an intermediary server 100. Here, the information provider terminal 10, the information purchaser terminal 20, and the intermediary server 100 can be connected among one another via a network.

The information provider terminal 10 is a terminal owned by a seller who wants to sell the privacy information, and may include wired terminals such as a personal computer (PC), as well as wireless terminals such as a mobile phone, a smartphone, a personal digital assistant (PDA), a portable multimedia player (PMP), a tablet PC, and a laptop, etc. The information provider terminal 10 may input the privacy information including the name, gender, address, phone number, mail address, income, hobby, job, age, family relationship, and account number, etc. of the information provider to the intermediary server 100 through an installed application (APP.) or application program.

In this case, when providing the privacy information to the information purchaser, the information provider terminal 10 may limit the scope of information use, and if the privacy information is used for promotion, the reward information may be provided with a predetermined amount, points, coupons, etc. according to the scope of privacy information limited from the information purchaser terminal 20.

The information purchaser terminal 20 is a terminal owned by a purchaser who wants to purchase the privacy information of others, and may include wired terminals such as personal computers (PCs), as well as wireless terminals such as mobile phones, smartphones, personal digital assistants (PDA), portable multimedia players (PMPs), tablet PCs, laptops, etc. The information purchaser terminal 20 may provide promotion including various advertisements, events, loans, and commodity advertisements, etc. by using the privacy information of the information purchaser provided from the intermediary server 100 through an installed application (APP) or an application program.

In this case, when the information purchaser terminal 20 receives the privacy information from the information purchaser, it provides promotion information within the limited scope of privacy information from the information purchaser, and can provide the reward information predetermined according to the scope of privacy information limited to the information purchaser terminal 20 that provided the privacy information used in the promotion information.

Meanwhile, the network may provide a connection path to the intermediary server 100 so that the information provider terminal 10 and the information purchaser terminal 20 may transmit and receive packet data after being connected to each other. The network may include, for example, a wired network such as Local Area Networks (LANs), Wide Area Networks (WANs), Metropolitan Area Networks (MANs), Integrated Service Digital Networks (ISDNs), or a wireless network such as wireless LANs, CDMA, 5G, Bluetooth, and satellite communication, but the scope of the present disclosure is not limited thereto.

The intermediary server 100 distributes the privacy information such as the name, address, phone number, and account number of the information provider terminal 10 input at the time of membership registration in the block using a blockchain, and stores the promotion information of the information purchaser terminal 20 and reward information predetermined according to the scope of privacy information. In addition, the intermediary server 100 may list the promotion information and the reward information stored in the information provider terminal 10, display the information purchaser terminal 20, and transmit the scope of privacy information use selected based on the displayed promotion information and reward information to the information purchaser terminal 20.

Here, the promotion information may include various advertisements, events, loans, commodity advertisements, etc, using the privacy information, and the reward information may include a reward amount for a predetermined amount, points, coupons, etc, according to the scope of privacy information.

In this case, the intermediary server 100 has the same constitution as a conventional web server in hardware, and includes a program module that is implemented software through various types of languages such as C, C++, Java, Visual Basic, Visual C, and the like and performs various functions.

The intermediary server 100 is linked with the information provider terminal 10 and the information purchaser terminal 20, lists the promotion information and reward information input from the information purchaser terminal 20, provides the information provider terminal 10, and can transfer the scope of privacy information selected from the information provider terminal 10 based on the provided promotion information and reward information to the information purchaser terminal 20.

Like this, the information provider may check the promotion information and reward information presented by the information purchaser, select the scope of privacy information use, and set the privacy information to be limited in the promotion (information purchaser, privacy information scope, etc.). In addition, the information purchaser may use only limited the privacy information set by the information provider for the promotion, and may provide the information provider with the reward information amount, points, coupons, etc. predetermined according to the scope of the privacy information for using in the promotion.

In this case, the intermediary server 100 only transmits the information on the information provider and the information purchaser, but is not involved in the reward amount. Therefore, since the information provider and the information purchaser fail to have an intermediate fee for processing the reward amount, the information provider may receive a high reward amount, and the information purchaser can generate low promotion costs.

Meanwhile, the intermediary server 100 may perform an authentication process by a confirmation through an authorized certificate to block illegal or malicious use of the privacy information, promotion information, and reward information input from information providers and information purchasers. Also, the intermediary server 100 may distribute and store the privacy information input from the information provider in a block using a blockchain.

Like this, the intermediary server 100 may provide safety and security for service use by performing the authentication process and providing a privacy information intermediary service for the information provider and the information purchaser authenticated through blockchain technology. For reference, the authentication process and the blockchain service may apply an existing information authentication system.

In addition, the intermediary server 100 may provide the information provider with listed promotion information and reward information on request so that the scope of privacy information contracted for each information purchaser can be modified, deleted, and added from time to time. This will allow the information provider to change the scope of privacy information in the future through reward and promotion methods deposited and promoted by the information purchaser, so that the information purchaser can use more privacy information. This may result in increased safety and reward for the use of privacy information for the information provider, and the information purchaser will be able to increase the scope of privacy information and the number of information providers available for promotion, thereby increasing the stability and publicity.

Hereinafter, the intermediary server used in the exemplary embodiment of the present disclosure will be described in more detail.

FIG. 2 is a block diagram specifically illustrating the constitution of the intermediary server in FIG. 1. A transaction intermediary server 100 illustrated in FIG. 2 is according to the exemplary embodiment of the present disclosure, and the constituents are not limited to the exemplary embodiment illustrated in FIG. 2, and some constituents can be added, changed, or deleted as needed.

As illustrated in FIG. 2, the intermediary server 100 includes a transceiver 110, a privacy information collection unit 120, a purchase information collection unit 130, a list generation unit 140, a scope setting unit 150, a reward amount calculation unit 160, an authentication unit 170, and a storage unit 180.

The transceiver 110 performs mutual communication with both the information provider terminal 10 and the information purchaser terminal 20 through wired and wireless communication methods through a network. That is, the transceiver 110 may perform mutual communication between the information provider terminal 10 and the information purchaser terminal 20 so that privacy information transaction can be made between the information provider and the information purchaser.

The privacy information collection unit 120 may collect by being input the privacy information such as the name, gender, address, phone number, mail address, income, hobby, job, age, family relationship, and account number, etc. of the information provider from the information provider terminal 10 connected through the transceiver 110. In this case, the privacy information includes information input by the information provider when signing up for membership, but the information is not limited thereto, and may include the privacy information of the information provider using big data.

The purchase information collection unit 130 may receive and collect predetermined reward information according to the scope of the promotion information and privacy information of the information purchaser in which the collected privacy information is used from the information purchaser terminal 20 connected through the transceiver 110. Here, the promotion information may include various advertisements, events, loans, goods advertisements, etc. using the privacy information, and the reward information may include reward amounts such as amounts, points, coupons, etc. predetermined according to the scope of privacy information.

The list generation unit 140 may generate the purchase information list by listing the reward information determined according to the content of promotion information and the scope of privacy information for each information purchaser using the promotion information and reward information collected by the purchase information collection unit 130. In addition, the list generation unit 140 may provide the generated purchase information list to the information provider terminal 10 through the transceiver 110.

FIG. 3 is the exemplary embodiment illustrating the constitution of a purchase information list generated by the list generation unit illustrated in FIG. 2, and as illustrated in FIG. 3, the purchase information list displays the reward information determined according to the privacy information usage scope determined by the information purchaser, and a selection window may be configured so that one or more of the displayed reward information can be selected by the information provider.

In this case, the more selected the selection window configured for each information purchaser, the higher the reward information paid to the information provider, that is, the reward amount. In addition, all types of privacy information corresponding to the selection window may be set to different reward amounts.

The scope setting unit 150 may set a scope of providing information purchaser and privacy information selected by the information provider, through a purchase information list provided to the information provider terminal 10. In this case, the scope of the selected privacy information may be enlarged and set to the scope of the household (family) of the information provider.

Since the amount of reward paid from the information purchaser varies depending on the type of privacy information and the number of privacy information selected, the information provider will be able to choose appropriately according to their will. In addition, when the privacy information is used for public relations, the information provider may receive a reward amount for the amount, points, coupons, etc. predetermined according to the limited scope of privacy information.

Like this, since the information provider may select the information purchaser who wants to sell the privacy information through the purchase information list in the scope setting unit 150 and may limit the scope of privacy information to be sold, the information provider can only make the privacy information available to legitimate information purchasers of the her choice within the scope of the (consent information purchasers, privacy information, etc.), and may confirm the privacy information. This can prevent the illegal information purchaser or the legal information purchaser from obtaining their privacy information and indiscriminately using it.

The reward amount calculation unit 160 may calculate the reward amount paid from the information purchaser to the information provider based on the information purchaser and the privacy information scope of each information purchaser selected by the scope setting unit 150.

In this case, the calculated reward amount may include an amount, points, coupons, etc., and in this case, the reward amount is delivered directly by the information purchaser to the information provider without involvement of the intermediary server 100. Therefore, since the information provider and the information purchaser have no intermediate fee for handling the reward amount, the information provider may receive a high reward amount, and the information purchaser may incur a small promotional cost.

The authentication unit 170 verifies and authenticates the privacy information provided by an information provider, and promotion information and reward information of an information purchaser. That is, the authentication unit 170 may authenticate the information provider and the privacy information provided by the information provider using a public authentication service that is currently performed. In addition, the authentication unit 170 can verify that the information purchaser's promotion information is a legitimate place of business, check whether the reward amount from the information purchaser to the information provider is properly transmitted, and if necessary, legal measures such as content certification may be taken by the information purchaser.

The storage unit 180 may store various data used by at least one component of the intermediary server 100. The data may include, for example, input data or output data for software and related instructions. For example, the storage unit 180 may store at least one instruction for selling and promoting the privacy information and providing reward support services. The storage unit 180 may store and manage information e.g., privacy information, promotion information, reward information, scope of privacy information, etc. related to information purchasers subscribed to the intermediary server 100 for privacy information sales, promotion, and reward support services. The storage unit 180 may include a volatile memory or a nonvolatile memory.

Meanwhile, the privacy information related to the information provider input from the information provider terminal 10 (e.g., a name, gender, an address, a phone number, a mail address, income, a hobby, a job, age, a family relationship, and an account number) is distributed and stored in the block of the blockchain, so that the privacy information of the information provider is safely stored and no inconvenience occurs in using the service.

Referring the drawing attaching the operation of a system for trading privacy information according to the present disclosure configured as described above will be specifically described as follows. The same reference numerals as in FIG. 1 or FIG. 2 refer to the same member performing the same function.

FIG. 4 is a flowchart for explaining a system for trading privacy information according to the exemplary embodiment of the present disclosure.

Referring to FIG. 4, the privacy information such as a name, gender, an address, a phone number, a mail address, income, a hobby, occupation, age, a family relationship, and an account number may be collected by being input from the information provider terminal 10 using the privacy information collection unit 120 (S10). In this case, the privacy information includes information input by the information provider when signing up for membership, but the present disclosure is not limited thereto, and the privacy information may include the privacy information of the information provider using big data. In addition, the privacy information is distributed and stored in the block using the blockchain, and the privacy information is distributed and stored in the block using the blockchain for safe storage and management.

In addition, the purchase information collection unit 130 may be used to receive and collect pre-set reward information according to the promotional information of the information purchaser and the scope of the privacy information used by the information purchaser terminal 20 S20. Here, the promotional information may include various advertisements, events, loans, commodity advertisements, etc. using the privacy information, and the reward information may include reward amounts such as amounts, points, coupons, etc., predetermined according to the scope of privacy information.

In this case, the privacy information of the information provider and the promotion information and the reward information of the information purchaser may be collected through the membership of the information provider and the information purchaser.

Meanwhile, the collected privacy information, promotion information, and reward information are authenticated using the authentication unit 170. In this case, the authentication method performed is to authenticate the privacy information provided by the information provider and the information provider using the currently authorized certification service in place, and it is authenticated by checking whether the information purchaser's promotional information is a legitimate workplace, and whether the reward amount delivered from the information purchaser is properly delivered to the information provider. In addition, the authentication unit 170 may perform legal measures such as a certification of contents to the information provider and the information purchaser if necessary.

Subsequently, the list generation unit 140 may generate the purchase information list by listing the reward information determined according to the content of promotion information and the scope of privacy information for each information purchaser using the promotion information and reward information collected by the purchase information collection unit 130 S30. The list generation unit 140 may provide the generated purchase information list to the information provider terminal 10 through the transceiver 110.

The purchase information list displays the reward information set according to the scope of privacy information use set by the information purchaser, and the selection window may be configured so that at least one of the displayed reward information can be selected by the information provider. In this case, the more selected the selection window configured for each information purchaser, the higher the reward information paid to the information provider, that is, the reward amount. In addition, all types of privacy information corresponding to the selection window may be set to different reward amounts.

Next, the scope setting unit 150 may be used to set a scope of providing information purchasers and privacy information selected by the information provider through the purchase information list provided to the information provider terminal 10 S40. In this case, the scope of the selected privacy information may be enlarged and set to the range of the household family of the information provider.

Also, the reward amount calculation unit 160 may calculate the reward amount paid from the information purchaser to the information provider based on the privacy information scope for each information purchaser and information purchaser selected by the scope setting unit 150 S50.

The reward amount calculation unit 169 may transmit the calculated reward amount information to the information purchaser terminal 20 so that the information purchaser can deliver the reward amount to the information provider's deposit account. In this case, the intermediary server 100 may check whether the reward amount is correctly delivered from the information purchaser to the information provider through the authentication unit 170 and may take legal measures such as the certificate of contents to the information provider and the information purchaser if necessary. The calculated reward amount may include an amount, points, coupons, and the like.

Like this, since the reward amount is delivered directly to the information provider from the information purchaser regardless of the intermediary server 100, the information provider and the information purchaser can receive a high reward amount without an intermediate fee for processing the reward amount, and the information purchaser can incur low promotional costs.

And, when it is confirmed that the reward amount has been delivered to the information provider's deposit account, the intermediary server 100 transmits the privacy information stored in the blockchain to the information purchaser terminal.

Through this method, since the information provider who sells the privacy information may select the information purchaser who wants to purchase the privacy information and limit the scope of privacy information to be sold, the information provider may only make the privacy information available to legitimate purchasers of the choice within the scope of the consent information purchasers, privacy information, etc. This can prevent the illegal information purchaser or the legal information purchaser from obtaining their privacy information and indiscriminately using the privacy information.

Also, the privacy information inputted through the information provider terminal 10 is distributed and stored in the block using the blockchain through the intermediary server 100, and the privacy information stored in the blockchain is delivered to the information purchaser terminal 20 through the intermediary server 100, so that the intermediary server 100 does not store anything related to the privacy information of the information provider but is distributed in the block of the blockchain, and also, no inconvenience occurs in using the service.

Meanwhile, the device according to the disclosed exemplary embodiment may include a processor, a memory that stores and executes program data, a permanent storage such as a disk drive, a communication port that communicates with an external device, and a user interface device such as a touch panel, a key, a button, etc. The methods implemented by software modules or algorithms may be stored on a computer-readable recording media as computer-readable codes or program instructions on the processor. Here, the computer-readable recording media include a magnetic storage media (e.g., read-only memory ROM, random-access memory RAM, floppy disk, hard disk, etc.), and an optical reading media (e.g., CD-ROM, DVD, etc.). The computer-readable recording media may be distributed over the computer systems connected by the network, and the computer-readable code may be stored and executed by the distributed manner. The medium is computer-readable, stored in a memory, and may be executed on a processor.

All documents including published documents, patent applications, patents, etc. cited in the disclosed exemplary embodiments may be incorporated into the disclosed embodiment in the same manner as each cited document is individually and specifically combined or a whole in the published embodiment.

For understanding of the disclosed exemplary embodiments, reference numerals are described in the preferred exemplary embodiments illustrated in the drawings, and specific terms are used to describe the disclosed embodiments, but the embodiments disclosed by the specific terms are not limited, and the disclosed embodiments may include all components generally considered by a person skilled in the art.

The disclosed exemplary embodiments may be represented by functional block constitutions and various processing steps. These functional blocks can be implemented with various numbers of hardware and/or software constitutions that perform specific functions. For example, the disclosed exemplary embodiment may have integrated circuit constitutions such as memory, processing, logic, lookup table, etc., which can execute various functions by the control of one or more microprocessors or other control devices. Similar to constituents of the disclosed exemplary embodiment that may be executed as software programming or software elements, the disclosed exemplary embodiment may be implemented in programming or scripting languages such as C, C++, Java, assembler, or various algorithms implemented in combination of data structures, processes, routines, or other programming constitutions. Functional aspects may be implemented as algorithms executed in one or more processors. Furthermore, the disclosed exemplary embodiment may have conventional techniques for electronic constitution, signal processing, and/or data processing. The terms such as "mechanism", "element", "means", and "constitution" may be widely used, and are not limited to mechanical and physical configurations. The terms may indicate a series of processes of software in connection with a processor or the like.

Certain implementations described in the disclosed exemplary embodiment are the exemplary embodiments, and do not limit the scope of the disclosed embodiment by any means. For the sake of simplicity of the specification, the descriptions of conventional electronic constitutions, control systems, software, and other functional aspects of the systems may be omitted. In addition, the connections or connection members of the lines among the constitutions illustrated in the figure exemplarily represent functional connections and/or physical or circuit connections, which may represent alternative or additional various functional connections, physical connections, or circuit connections in the actual device. In addition, it may not be a necessary component for the application of the disclosed embodiment unless specifically stated, such as "essential", "important", etc.

Also, a person skilled in the art of the present disclosure will understand that various embodiments are possible within the scope of the technical idea of the present invention. Therefore, the true technical protection scope of the present disclosure should be determined by the technical idea of the accompanying claims.

EXPLANATION OF CODES

10: Information provider terminal
20: Information purchaser terminal
100: Intermediary server
110: Transceiver
120: Privacy information collection unit
130: Purchase information collection unit
140: List generation unit
150: Scope setting unit
160: Reward amount calculation unit
170: Authentication unit
180: Storage unit
What is claimed:

1. A system for trading privacy information, comprising:
an information provider terminal;
an information purchaser terminal; and
an intermediary server comprising:
a transceiver that performs data communication with the information provider terminal and the information purchaser terminal via a network;
a privacy information collection unit that receives and collects privacy information from the information provider terminal;
a purchase information collection unit that receives and collects promotion information from the information purchaser terminal and corresponding reward information predetermined according to one or more privacy information usage scopes of the privacy information;
a list generation unit that generates, for the information purchaser, a purchase information list by listing reward information determined according to content of the promotion information and the one or more privacy information usage scopes of the privacy information;
a scope setting unit that sets a scope of providing the privacy information to an information purchaser selected by the information provider through the purchase information list, wherein the information provider directly selects and limits a scope of privacy information to be sold based on reward amounts displayed according to types and number of the privacy information such that the privacy information is used only by a legitimate information purchaser selected by the information provider within a consented scope;
reward amount calculation unit that calculates a reward amount to be paid from the selected information purchaser to the information provider based on the selected scope of privacy information for the selected information purchaser;
an authentication unit that authenticates the information provider and the information purchaser via an authorized digital certificate and verifies that the reward amount from the selected information purchaser is delivered to the information provider; and
a storage unit that distributes and stores the privacy information in one or more blocks of a blockchain ledger for secure storage and management of the privacy information,
wherein:
the storage unit that, upon receipt of the privacy information by the privacy information collection unit from the information provider terminal, immediately distributes and stores the privacy information in one or more blocks of the blockchain ledger, such that the intermediary server does not store anything related to the privacy information of the information provider outside of the blockchain ledger, the privacy information is maintained exclusively within the one or more blocks of the blockchain ledger, and the intermediary server retains no copy of the privacy information and functions solely as a routing and orchestration layer with respect to any subsequent transmission of the privacy information from the blockchain ledger;
the purchase information list displays reward information set according to a privacy information usage scope defined by the information purchaser and includes selection windows configured to allow the information provider to select one or more of the displayed reward information;
higher reward amounts are paid to the information provider as more of said selection windows corresponding to the privacy information are selected by the information provider;
different reward amounts are set according to different types of the privacy information corresponding to the respective selection windows;
the purchase information list, including promotion information comprising advertisements, events, loans, and commodity advertisements collected by the purchase information collection unit, is provided to the information provider terminal via the transceiver;
each said reward amount is transferred directly from the corresponding information purchaser to the information provider without involvement of the intermediary server;
upon verification by the authentication unit that the reward amount has been delivered from the information purchaser to the information provider, the transceiver automatically transmits the privacy information within the selected scope from the blockchain ledger to the information purchaser terminal; and
subsequent to said transmitting of the privacy information within the selected scope, the intermediary server is further configured to, upon a request from the information provider, provide the purchase information list again to the information provider terminal to enable the information provider to modify the consented scope of privacy information for the selected information purchaser by adding or removing privacy information via the selection windows, cause the reward amount calculation unit to recalculate an updated reward amount based on the modified scope, and transmit any added privacy information corresponding to the modified scope from the blockchain ledger to the information purchaser terminal only after the authentication unit confirms that an additional reward amount corresponding to the modified scope has been delivered from the information purchaser to the information provider.

2. A method for trading privacy information, comprising:
A first step of receiving and collecting, by an intermediary server via a transceiver, privacy information from an information provider terminal, and distributing and storing the privacy information in one or more blocks of a blockchain ledger for secure storage;
a second step of receiving and collecting, by the intermediary server via the transceiver, promotion information from an information purchaser terminal and corresponding reward information that is predetermined according to a scope of the privacy information;

a third step of authenticating, by an authentication unit of the intermediary server, the collected privacy information and the collected promotion information and reward information, including verifying an information provider and an information purchaser via a digital certificate-based service to ensure both the information provider and the information purchaser are authorized parties;

a fourth step of generating, by a list generation unit, a purchase information list listing reward information determined according to content of the promotion information and the scope of the privacy information for the information purchaser;

a fifth step of providing, by the transceiver, the purchase information list to the information provider terminal and setting, by a scope setting unit, a scope of privacy information to be provided to an information purchaser selected by the information provider through the purchase information list, wherein the information provider directly selects and limits the scope of privacy information to be sold based on reward amounts displayed according to the types and number of privacy information, such that the privacy information is used only by a legitimate information purchaser selected by the information provider within a consented scope;

a six step of calculating, by a reward amount calculation unit, a reward amount to be paid from the selected information purchaser to the information provider based on the selected scope of privacy information;

a seven step of transmitting, by the transceiver, information indicative of the calculated reward amount to the information purchaser terminal to prompt a direct transfer of the reward amount from the information purchaser to the information provider;

an eighth step of confirming, by the authentication unit, that the reward amount has been delivered from the information purchaser to the information provider;

a nineth step of responsive to said confirming, transmitting, by the transceiver, the privacy information within the selected scope from the blockchain ledger to the information purchaser terminal;

a tenth step of providing, by the intermediary server via the transceiver and in response to a subsequent request from the information provider after the nineth step, the purchase information list again to the information provider terminal to allow the information provider to modify the consented scope of privacy information for the selected information purchaser by selecting or deselecting one or more of the selection windows on the purchase information list;

an eleventh step of recalculating, by the reward amount calculation unit, an updated reward amount based on the modified scope of the privacy information selected by the information provider; and a twelfth step of transmitting, by the transceiver, any additional privacy information within the modified scope from the blockchain ledger to the information purchaser terminal, after confirming, by the authentication unit, that an additional reward amount corresponding to the modified scope has been delivered from the information purchaser to the information provider, wherein:

upon receipt of the privacy information from the information provider terminal, the privacy information is immediately distributed and stored in one or more blocks of the blockchain ledger for safe storage and management, such that the intermediary server does not store anything related to the privacy information of the information provider outside the blockchain ledger, the privacy information is maintained exclusively within the one or more blocks of the blockchain ledger, and the intermediary server retains no copy of the privacy information and functions solely as a routing and orchestration layer with respect to any subsequent transmission of the privacy information from the blockchain ledger;

the purchase information list displays reward information set according to a privacy information usage scope defined by the information purchaser and includes selection windows allowing the information provider to select one or more of the displayed reward information;

higher reward amounts are paid to the information provider as more selection windows corresponding to the privacy information are selected by the information provider;

different reward amounts are set according to different types of the privacy information corresponding to the selection windows;

the purchase information list includes promotion information comprising advertisements, events, loans, and commodity advertisements collected by the purchase information collection unit and is provided to the information provider terminal via the transceiver; and each said reward amount is transferred directly from the information purchaser to the information provider without involvement of an intermediary, such that no intermediate entity processes or holds the reward transfer.

* * * * *